United States Patent [19]

Barton

[11] Patent Number: 4,630,109
[45] Date of Patent: Dec. 16, 1986

[54] VEHICLE TRACKING SYSTEM

[75] Inventor: Russell R. Barton, Hamilton Township, Mercer County, N.J.

[73] Assignee: Standard Telephones & Cables Public Limited Company, London, England

[21] Appl. No.: 706,952

[22] Filed: Feb. 28, 1985

[51] Int. Cl.⁴ .............................................. H04N 7/18
[52] U.S. Cl. .................................... 358/103; 180/168; 180/169; 364/424; 364/426
[58] Field of Search .................. 358/93, 103, 108; 180/169, 168; 364/424, 426

[56] References Cited

U.S. PATENT DOCUMENTS

| | | | |
|---|---|---|---|
| 4,345,662 | 8/1982 | Deplante | 180/168 |
| 4,379,497 | 4/1983 | Hainsworth et al. | 180/168 |
| 4,437,533 | 3/1984 | Bierkarre et al. | 180/168 |
| 4,541,049 | 9/1985 | Ahlbom | 180/168 |
| 4,566,032 | 1/1986 | Hirooka | 358/103 |

Primary Examiner—Howard W. Britton
Attorney, Agent, or Firm—Kerkam, Stowell, Kondracki & Clarke

[57] ABSTRACT

A vehicle tracking system for determining the lateral position of a moving vehicle relative to an optically distinct line extending along the roadway on which the vehicle travels. A camera periodically scans the roadway including the optically distinct line thereon. Signals representing successive scans are stored then correlated to determine the lateral movement of the vehicle between scans.

6 Claims, 5 Drawing Figures

VEHICLE TRACKING SYSTEM

BACKGROUND OF INVENTION

1. Field of Invention

This invention is concerned with a system for detecting the lateral position of a vehicle relative to a guidance means, and more particularly to such a system where there is no special guidance means.

2. Description of Prior Art

There are are number of systems for guidance of vehicles along a special track. Such systems allow for automated guidance of vehicles along the special track. In the prior art it is common that the track be either three dimensional (e.g., a raised rail) or made of special material such as a magnetic stripe or a reflective material or have electrical signals propagating therealong. Such systems do not operate properly when no special guide track is provided.

SUMMARY OF THE INVENTION

In accordance with a preferred embodiment of the present invention, a vehicle tracking system for determining the lateral position of a vehicle relative to a desired roadway path comprises, in combination, a scanning means functionally attached to said vehicle for optically scanning at a known rate a path transverse to the intended direction of travel of the vehicle at time spaced intervals as the vehicle travels along the roadway, there being included in the scan path an optically distinct feature extending substantially parallel to the path intended to be traversed by the vehicle. The scan means produces a signal corresponding to the reflection of the scanned path. The tracking system further includes means for storing the signals resulting from the time spaced scans including the signal portion corresponding to the optically distinct feature and means responsive to the stored signals for producing signals indicative of the time deviation of the signal portion resulting from successive scans for thereby determining the amount of lateral displacement of the vehicle relative to the optically distinct feature.

DETAILED DESCRIPTION OF A PREFERRED EMBODIMENT

Figure 1:
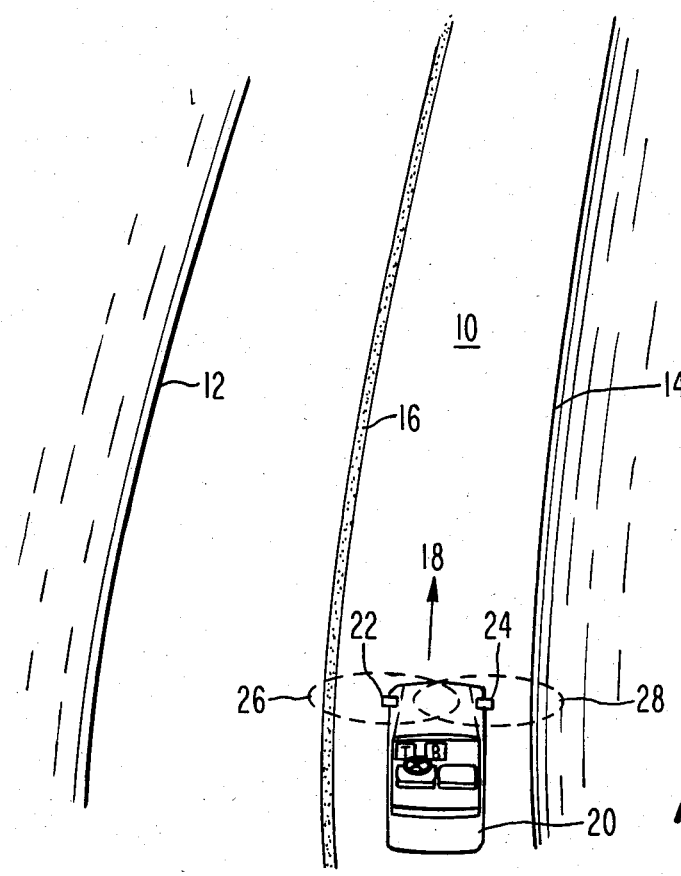
FIG. 1 illustrates an exemplary roadway and vehicle to be guided therealong using a vehicle tracking system in accordance with a preferred embodiment of the present invention.

With respect to FIG. 1, there is illustrated a roadway 10 marked by optically distinct features such as edges 12 and 14, respectively, and a center painted stripe 16. The painted stripe is the standard type used for lane marking purposes and is optically distinct from the roadway 10, thus providing different reflectivity of light impinging thereon. A vehicle 20 (illustrated without a roof so interior components are visible) to be guided along the roadway 10 while moving in the direction of arrow 18, has mounted on the underside first and, optionally, second optical sensing means 22 and 24. Each optical sensing means may be a television camera and may advantageously take the form of a charge coupled device (CCD) video camera with an appropriate wide-angle lens. The camera is arranged to scan in an elongated path transverse the direction of vehicle travel, as illustrated by dashed lines 26 or 28.

In fact, a CCD camera having only one or a few rows of CCD elements corresponding to a like number of scan lines is employed. In theory, as will be described hereinafter, only a single line array of CCD elements corresponding to a single scan line is necessary. However, due to noise in the electronic sense, it is deemed desirable to have a multiple array CCD and then average the results of several scan lines. The scanned path of camera 22 must be wide enough to encompass lane divider line 16. Similarly, the scanned path of camera 24 must be wide enough to encompass roadway edge 14.

Roadway 10 may alternatively take the form of a factory floor over which passes a self-piloted vehicle 20. Vehicle 20 may be ideally centered over line 16 so that only one centrally positioned (laterally of vehicle 20) camera 22 is needed.

Figure 2:
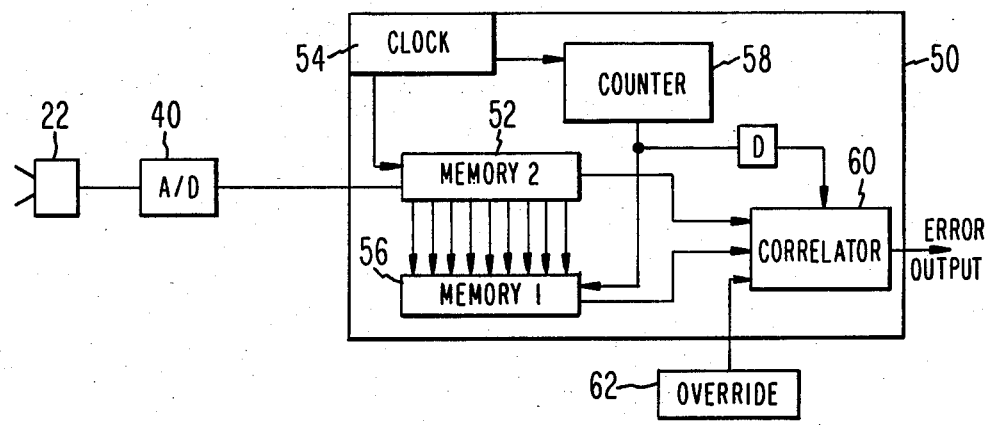
FIG. 2 is the vehicle tracking system, used for guidance of the vehicle in FIG. 1, in electrical block and logic form.

With respect to FIG. 2, camera 22 is illustrated by way of example and is coupled to analog-to-digital converter (A/D) 40. A/D 40 receives, as a function of time an analog signal, which in amplitude, represents light reflected to camera 22 from the roadway. A/D 40 converts the analog signal into digital signals having time spaced values representing the values of signal reflected from the roadway along the scanned path of camera 22. A/D 40 is coupled to a correlation system 50. Correlation system 50 could take the form of a properly programmed microcomputer with storage memory, could take the form of hardware elements, as illustrated, or could be a combination of a programmed microprocessor and special hardware. The selection will depend on the relative costs which, in turn, depend on the number of systems needed.

As illustrated in FIG. 2, A/D 40 is coupled to a first serial shift-in, serial shift-out, parallel shift-out memory 52 within system 50. A master clock 54 is also coupled to memory 52 to control signal translation therethrough. The parallel output of memory 52 is coupled to a similar memory 56 which has a parallel shift-in, serial shift-out capacity. Memory 56 is also designated memory 1 and memory 52 is also designated memory 2 for purposes of the description of operation which follows hereinafter. Memories 52 and 56 are coupled to correlator 60. Counter 58 is also coupled to correlator 60 via delay D.

A block 62 marked "override" is also connected to correlator 60. The override signal can come from vehicle 20, FIG. 1, such as from brakes B or turn signals T or be an operator-entered override. The output of correlator 60 is connected to appropriate error circuitry (not shown). The error circuitry may take the form of signals directing the steering mechanism of vehicle 20 or may be an alerting signal, such as a buzzer, to warn a sleepy vehicle driver.

Operation of the system of FIG. 2 is as follows. Cameras 22 and/or 24 are adapted to continually scan, or to scan at time separated points, the roadway surface toward which it is/they are directed, a surface which must contain some sort of guideline which is optically different from adjacent parts of the roadway. Typically, that optically different guideline will take the form of a painted line such as 16, FIG. 1, but it could alternatively or in addition take the form of a road edge 14 so long as there is a sufficiently different reflectivity of the road 10 and adjacent material beyond edge 14. The signal representing the reflectivity in a scan transversely of roadway 10, as seen by camera 22 and/or camera 24, is converted to an equivalent digital signal by A/D 40 and clocked into memory 2 (52) as pixels by clock 54 at the same rate that the scan signal is being output from the camera. (There could, of course, be some sort of intermediate storage means either in the camera or in A/D 40 but the principle is that the digitized signal stored in the various cells of memory 2 correspond to scans of different points transversely of roadway 10.) Thus, in the time taken to scan one line by the camera (22 and/or 24) the time to output a signal representing one scan line into memory 2 is filled with a digital signal representing that scan line.

After the appropriate delay determined by counter 58, the contents of memory 2 are transferred to memory 1 and new scan information representing a successive lateral scan further along roadway 10 in the direction of arrow 18, FIG. 1, is entered into memory 2. It can thus be seen that memory 1 contains the first or older information and memory 2 contains the second or newer information in each case. This is thus the reason for the memory numbers being as they are.

After a slight delay occasioned by delay D, following the transfer of information from memory 2 to memory 1, the contents of memories 1 and 2 are transferred to correlator 60. Assuming no override signal from override 62, the correlator effectively looks at both input signals looking for a portion of the signal representing a sharp reflective transition which is occasioned by a scan across line 16 or roadway edge 14, looking at where in the digital data the sharp change in reflectivity occurs which corresponds to where laterally the vehicle is positioned.

Figure 3A:
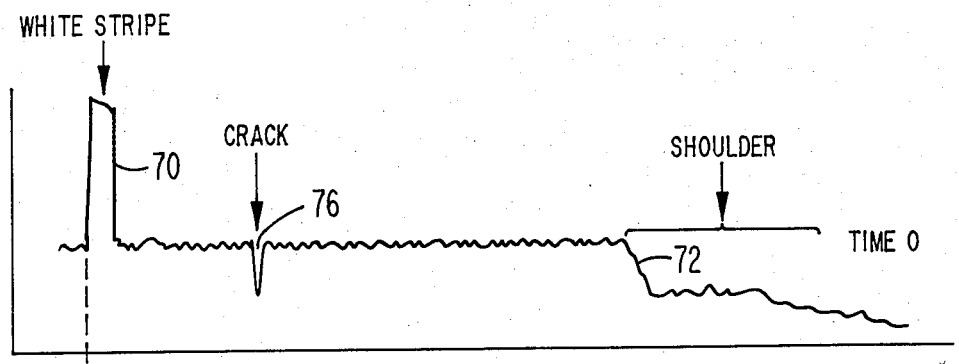
FIGS. 3a–3c are a set of waveforms useful in understanding the operation of the FIG. 2 system.
Figure 3B:
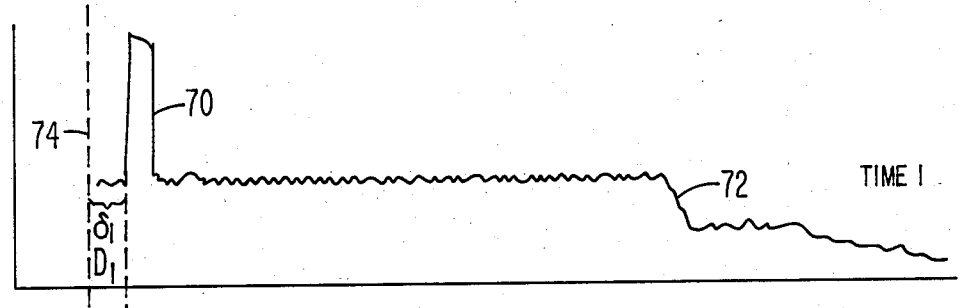
Figure 3C:
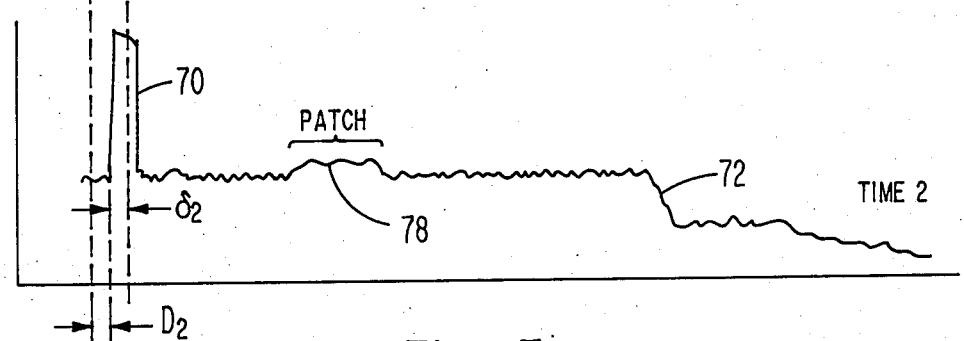

This will be best understood by reference to FIG. 3 to which attention is now directed. FIGS. 3a, 3b, and 3c each represent the output of cameras 22 and 24 combined resulting from scans transverse roadway 10 at times 0, 1, and 2, respectively. On each waveform the vertical axis is in terms of amplitude while the horizontal axis is in terms of time. As a practical matter, the time correlates with distance so the horizontal axis can be thought of representing distance transversely of roadway 10. The three waveforms represent scans at successive times $\Delta_t$ apart, where $\Delta_t$ is determined by a preprogrammed count in counter 58 and is typically a fraction of a second. The waveforms can be thought of as the analog equivalent of three digitally stored signals in memories 1 or 2. It will be noted that in each of FIGS. 3a, 3b, and 3c prominent signal portions 70 correspond to the white stripe (16, FIG. 1) and 72 correspond to the roadway shoulder (14, FIG. 1). Other road characteristics which are optically distinct but do not extend for any distance are illustrated by way of example in FIG. 3a (a crack 76) and in FIG. 3c (a road patch 78).

For purposes of discussion, it will be assumed that in FIG. 3a at time 1 that the vehicle is precisely where it is supposed to be laterally with reference to stripe 16. In FIG. 3b, it can be seen that the vehicle has been displaced by a distance $\delta_1$ and in FIG. 3c the vehicle is displaced by a distance $\delta_2$ relative to $\delta_1$, where $\delta_2$ is smaller in magnitude than $\delta_1$, and of opposite sign indicating that the vehicle has by time 2 swung back toward its proper alignment as illustrated in FIG. 3a, time 0.

The purpose of correlator 60, FIG. 2, is to determine the various differences $\delta$ and ultimately distance $D_t$ the absolute displacement from some acceptable lateral location to determine whether D is continuing to get larger to the point of being a potential hazard or whether D is within an acceptable range about the desired lateral position of the vehicle.

Although there are many correlation algorithms, one such algorithm is as follows. Assume that each of memories 1 and 2, FIG. 2, contains n memory cells numbered 1 . . . n each storing in digital form amplitude information (called a pixel) of value $x_i$, where i ranges from 1 to n and n may typically be from 200–600. Thus, at any time memory 1 will contain n pixels corresponding to an earlier scan in time such as, for example, time 0, FIG. 3a, and memory 2 will contain n pixels corresponding to a scan at a later time, such as time 1. Correlator 60 then determines the difference $\delta$ in pixels of any particular j'th time by choosing that $\delta$ as an offset which minimizes:

$$\sum_{i=1}^{n} |x_i^{j-1} - x_{i-\delta j}^{j}| \qquad (1)$$

and then determines D at time t by the formula:

$$D_t = \sum_{j=1}^{t} \delta_j \qquad (2)$$

In formula (1), for example, $x^j$ may refer to the various values of x at time 1 and $x^{j-1}$ may refer to values at time 0. First, the assumption will be made that $\delta$ is zero, thus the memory cells are subtracted on a one-for-one basis and the total summed to determine a number. This summation is done repeatedly with different amounts of offset (number of pixels) in the $x^j$ term. The assumed offsets can be positive and then negative. That assumed value of $\delta$ which leads to the minimum total summation is the amount of (more correctly corresponds to) displacement of the vehicle at time 1. Physical limits on the amount of lateral vehicle 20 movement that is possible between scan $\Delta_t$ apart limits the maximum offset size to a small number of pixels, provided the time $\Delta_t$ between scans is small enough in relation to maximum vehicle speed.

What is claimed is:

1. A vehicle tracking system for determining the lateral position of a vehicle relative to a desired roadway path including substantially parallel thereto an optically distinct feature comprising, in combination:

scanning means functionally attached to said vehicle for optically scanning, at a known rate, a path having a component transverse the intended direction of travel of said vehicle at time spaced intervals as said vehicle travels along said roadway, said scan means producing a signal corresponding to the reflection of the scanned path;

means concurrently storing said signals resulting from said time spaced scans including the signal portion corresponding to said optically distinct feature; and means responsive to stored signals from successive scans for producing signals indicative of the time deviation of said signal portion resulting from successive scans for thereby determining the amount of lateral displacement of said vehicle relative to said optically distinct feature.

2. The combination as set forth in claim 1 wherein said scanning means comprises a television camera.

3. The combination as set forth in claim 1 wherein said scanning means comprises a charge coupled device video camera.

4. The combination as set forth in claim 1 wherein said scanning means produces an analog signal and further including means receptive of said analog signal for producing a digital signal which is supplied to said means storing said signals.

5. The combination as set forth in claim 4 wherein said means storing said signals comprises first and second digital memories storing information relating to an earlier one of said scans and a later one of said scans, respectively.

6. The combination as set forth in claim 1 wherein said means receptive of said stored signals is a correlator.

* * * * *